United States Patent [19]

Harden et al.

[11] 3,875,434

[45] Apr. 1, 1975

[54] PRESSURE-SENSITIVE SENSOR/LOGIC ASSEMBLY

[75] Inventors: John Charles Harden, Wilmington; John Lawrence Knupp, Jr., Newark; Sebastian Vito Rocco Mastrangelo, Hockessin, all of Del.

[73] Assignee: E. I. du Pont de Nemours and Company, Wilmington, Del.

[22] Filed: Oct. 31, 1973

[21] Appl. No.: 411,427

[52] U.S. Cl. .................... 307/308, 180/103, 328/1, 340/52 H, 338/114, 338/99, 307/254

[51] Int. Cl. ........................................ H03k 17/00

[58] Field of Search ............ 338/114, 99; 280/150; 180/102, 103, 91; 340/52 H; 328/1; 307/308, 254

[56] References Cited

UNITED STATES PATENTS

| | | | |
|---|---|---|---|
| 2,951,817 | 9/1960 | Myers | 73/885 D |
| 3,556,556 | 1/1971 | Goetz | 180/103 |
| 3,701,903 | 10/1973 | Merhar | 340/52 H |
| 3,742,858 | 7/1973 | Stonestrom | 180/103 |
| 3,750,100 | 7/1973 | Ueda | 280/150 |
| 3,774,151 | 11/1973 | Lewis et al. | 340/52 H |
| 3,774,714 | 10/1973 | Usui et al. | 280/150 AB |

*Primary Examiner*—Michael J. Lynch
*Assistant Examiner*—B. P. Davis
*Attorney, Agent, or Firm*—James A. Costello

[57] ABSTRACT

Disclosed herein is a sensor/logic assembly useful, inter alia, for actuating a vehicular safety device for passenger restraint, the assembly comprising, in cooperation, a non-ohmic pressure-sensitive sensor of selected conductive particles in an elastomeric matrix and a logic means for discriminating between electrical resistance or current values above and below a selectable threshold value.

21 Claims, 3 Drawing Figures

PRESSURE-SENSITIVE SENSOR/LOGIC ASSEMBLY

BACKGROUND OF THE INVENTION

1. Field of the Invention

This invention concerns a variable resistance monitorable, elastic pressure sensor of selected conductive particles in an elastomeric matrix in cooperation with a logic system for triggering a device. The logic system most preferably is a digital transistor logic system.

2. Description of the Prior Art

No prior art is known which discloses a monitorable and steeply responsive nonlinear pressure sensor in combination with a logic means in a sensor/logic assembly. Nor has there been any suggestion that such an assembly could serve as a reliable trigger for a device such as, say, a crash sensor. Crash sensors of the art are generally mechanical sensors and are not monitorable. Art directed to elastic resistors as pressure-sensitive elements fails to teach the advantage of nonlinear pressure response. In those instances when nonlinear response is disclosed the elastic resistor either has infinite resistance or too low a resistance at zero pressure so that the element is not monitorable as defined herein. There is no art disclosure of any combination of a non-ohmic, monitorable, nonlinear sensor with a logic means for any useful purpose.

SUMMARY OF THE INVENTION

This invention is directed to an electrically operated sensor/logic assembly for actuating a device, the assembly comprising, in cooperation, i. as sensor, a pressure-sensitive, non-ohmic elastic resistor comprising a continuous, elastomeric material having metallic-conductive particles distributed therein in sufficient volume ratio to impart to said resistor a monitorable standby resistance above a threshold value and a capability for resistance reduction below a threshold value upon application of a preselected degree of pressure, said threshold resistance value being discriminated by ii. a logic means connected thereto and adapted to provide a device-actuating signal upon reduction of sensor resistance below the threshold value.

In a preferred embodiment said metallic-conductive filler particles comprise at least one member selected from the group consisting of borides, carbides, nitrides, and silicides, of at least one transition metal selected from Periodic Groups IV, V and VI.

The invention includes the sensor/logic assembly when it is in operation, i.e., part of an electrical circuit that includes an electrical voltage supply for the logic means, an electrical voltage supply and an indicator for discriminating the monitorable resistance of the sensor, and, optionally, a device to be actuated. The invention also includes the sensor/logic assembly though not in operational relationship to the voltage supplies, indicator and/or device to be actuated.

In this invention, the term "logic means" includes all electrical and electronic connections between the sensor and the device to be actuated including at least two resistance-defining conductor electrodes in contact with the sensor element. The term "electrically operated" as employed herein includes the sensor/logic assembly whether in operation or not in operation, in the sense that when it is operated it is operated as part of an electrical circuit. By "non-ohmic" is meant a nonlinear relationship between sensor current flow and voltage provided by a voltage supply means and applied across the sensor.

The invention includes a preferred sensor/logic assembly that is adapted for reliably actuating a vehicular safety device in a crash situation. The preferred assembly broadly includes an inertial mass in crash alignment with the sensor. More particularly, the mass and assembly are in an arrangement such that a crash of a certain type and degree will be necessary to cause the mass to impact upon the sensor and thus actuate the safety device. That is, there will be actuation only at predetermined levels of pressure amplitude, duration and direction.

It is also a feature of this invention that a current-buildup delay means can be incorporated into the system to extend the time required by the logic means to detect that the threshold resistance (or current) has been achieved in a crash situation. For instance, the delay means can comprise at least one capacitor having sufficient capacitance to insure in conjunction with the monitorable standby resistance or lower resistances induced by road vibrations, an RC-time constant shorter than the duration of the crash, but long enough to avoid unwanted actuation of a protective device which could result in loss of driver control.

BRIEF DESCRIPTION OF THE DRAWINGS

In FIG. 1 the logic means 10 is a typical type 7474 TTL Flip-Flop. Inputs to logic means 10 are made to P (Preset) terminal 11 to flip and to R (Reset) 12 to flop. By flip is meant to produce a Logical 1 Output Voltage of about 3.3 volts at Q terminal 13; by flop is meant to produce a Logical 0 Output Voltage of essentially zero at the same terminal. These voltages are a portion of a higher voltage drawn from voltage supply means 14, typically 5.4 volts obtained from three mercury battery cells, and supplied to $V_{cc}$ power supply terminal 15. All voltages are measured with respect to G terminal 16, normally grounded externally.

Figure 1:
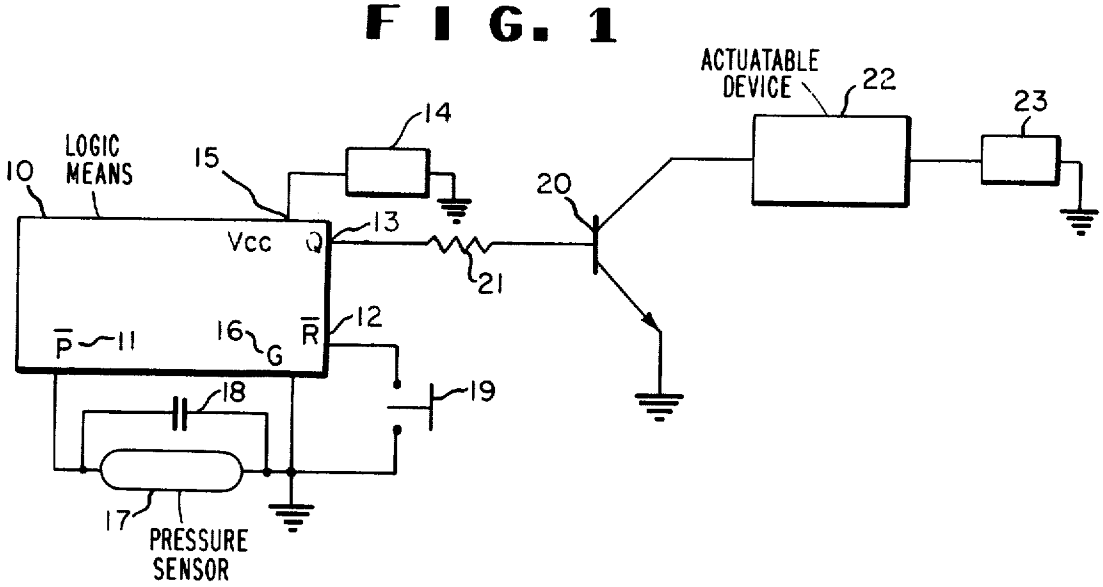
FIG. 1 is a schematic diagram showing a sensor/logic assembly which uses transistor-transistor logic (TTL) and its connection to a TTL-output current-actuated device. It must be appreciated that TTL logic is only one of many logic systems that are useful in connection with the disclosed sensor. TTL logic is preferred and is described as exemplary. The mechanics of other systems will be fully appreciated by those skilled in the art.

Pressure sensitive electrical resistor 17 having a pressure responsive surface is connected between terminals 11 and 16. It is shunted by a current-buildup delay means, namely capacitor 18 of sufficient size to establish an RC-time constant at the input to 11 longer than the period of the lowest frequency interfering signal that may be expected. Normally, open push-button 19 is connected between terminals 12 and 16 to short the terminals when resetting the circuit. Q output terminal 13 is connected to the base of transistor 20 by a resistor 21. A current-actuatable device 22 connects the collector of transistor 20 to a collector voltage supply 23, and the emitter of transistor 20 is grounded. The collector voltage supplied may be greater than, less than or the same as that provided by the voltage supply means connected to $V_{cc}$ terminal 15.

In using the sensor/logic assembly to actuate device 22 of FIG. 1 the presseure-sensitive electrical resistor has a finite resistance between about 50,000 ohms and 10 megohms in a standby condition that is monitorable by known resistance determining methods, for example, by serially connecting the sensor with a continuity-indicating lamp and a voltage source capable of supplying the rated lamp current, and observing the brightness of the lamp. Circuit connection may be made at selected times or intervals, with voltage supply means 14 or voltage supply 23 as the serially connected voltage source, if desired.

When pressure of suitable amplitude, say, 100 psi, and duration, say, 5 to 25 milliseconds, is applied to the sensor surface, say, 0.05 sq. inches in area, its resistance drops inversely with pressure below the selectable threshold resistance and reaches a value sufficiently low, say, 1,000 to 2,000 ohms, to flip the TTL circuit. The output voltage of, say, 3.3 volts, appearing at Q terminal 13 causes current of, say, 0.5 milliamperes, to flow through resistor 21, typically 10,000 ohms, which biases the transistor 20 on and allows current, say, 2 milliamperes to flow through device 22, thereby actuating it.

Figure 2:
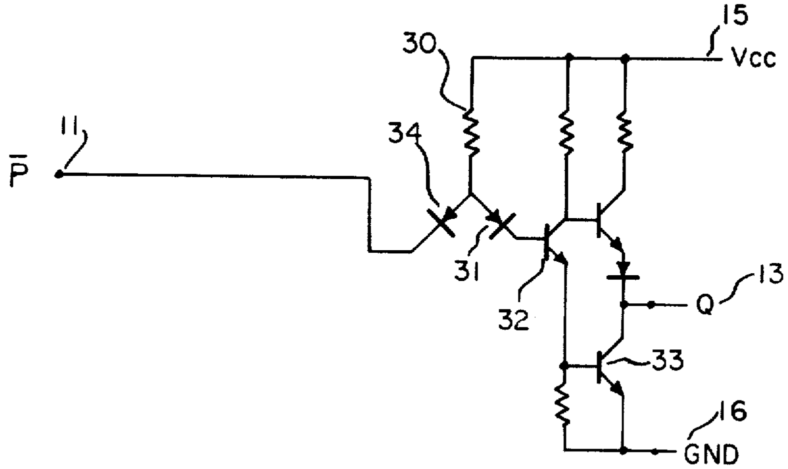
FIG. 2 is a circuit diagram showing a section of the TTL integrated circuit which discriminates between resistance values above and below a selectable threshold value of resistance.

FIG. 2 illustrates that section located internally within the TTL integrated circuit which discriminates the change in the resistance of the pressure-sensitive electrical resistor 17 of FIG. 1 and produces the above increased output voltage appearing at Q terminal 13.

The terminals marked PRESET, $V_{cc}$, Q, and GND correspond to terminals 11, 15, 13, and 16 of FIG. 1. All the integrated circuit components shown are internally located in a typical TTL logic means. Other components are generally present but are not germane to this illustration. In fact, only the current path leading from $V_{cc}$ terminal 15 to electrical resistor 30, through diode 31, and through base to emitter of each of the transistors 32 and 33 need be considered. The voltage at the PRESET terminal 11 is essentially the same as the voltage at the junction between the resistor 30 and the diode 31, and according to basic semiconductor circuit design, is equal to the sum of known silicon barrier voltages of the three forward-biased diodes, namely 31 and the base-emitter diodes of transistors 32 and 33, about 2.0 volts.

As pressure is applied to the pressure-sensitive electrical resistor 17 connected externally at the PRESET terminal (not shown in FIG. 2), sufficient current is diverted from the aforementioned path to an alternate path through diode 34 to the PRESET terminal 11 and the external resistor to cut off transistor 32, causing the flip-flop to preset. In doing this, the voltage supply means connected to the $V_{cc}$ terminal and also the current carrying connecting means which form this alternate path in the TTL act together as components of the operating sensor/logic assembly. The output voltage at Q terminal 13 then rises from a low voltage (reset) to a high voltage (preset). As described above, this turns on the device 22.

DETAILS OF THE INVENTION

The Sensor

The particles of metallic-conductive material are distributed relatively uniformly in an elastic matrix-forming material (elastomer). It is most preferred that the particles are not wetted by the elastomeric material. The particles are diluents in the sense the at they occupy volume but do not substantially reinforce the physical properties of the elastomeric material.

The contemplated sensor (resistor) is sufficiently elastic to withstand road vibration. It is also monitorable in a stand-by situation to establish readiness to function. The sensor is non-ohmic and there is not the ohmic relationship between voltage and current that would restrict operation of the invention concept.

The resistance of the sensor is inversely dependent upon pressure and at a predetermined level of pressure the resistance becomes low enough to trigger the logic circuit. Below the threshold pressure, resistance is high and varies slowly, though inversely, with pressure. However, above the selectable threshold pressure, the resistance becomes markedly and quickly lower. It is this preselected point of marked and quick resistance reduction that is reliably read by the logic system which triggers the auto safety device, or whatever.

The relationship, by volume, of the conductive particles to elastomeric material can vary somewhat depending upon the type of conductive particles selected, the type of elastomeric material, the particular end use, etc. Generally, it has been found that a volume ratio less than about 2 parts of particles to 3 parts of elastomeric material (40% particles by volume) can result in too high a resistance of the uncompressed elastic resistor i.e., greater than about 10 megohms for monitoring the readiness of the resistor or its presence. More than about 2 parts of particles per part of elastomeric material (67% particles by volume) can result in too low a resistance i.e., less than about 50,000 ohms under standby conditions and restricts the remaining available resistance range below the standby resistance that can be spanned under pressure. Preferably, the volume ratio is between about 1.0 and 1.5 parts of particles per part of elastomeric material in order to produce standby resistance values between 150,000 ohms and 1–2 megohms.

An attribute of the contemplated snesors is discussed with relation to the specific utility of detecting an automobile crash. The sensors are characterized by having electrical resistance that can be monitored in a standby situation, i.e., a generally non-pressurized (non-crash) situation; for example, each time when the ignition switch is turned on and the car started, an indicator or warning lamp on the dashboard lights to indicate to the driver that the sensor is operative or not operative if some part of the system has failed. Suitable circuitry can be devised by those knowledgable in the electronics art to monitor the sensors even when subjected to variable pressure (road vibrations and bumps).

An acceptable range for standby resistance, defined as the electrical resistance of the sensor at essentially zero pressure or relatively small prestressed pressure level, will be finite and will depend upon at least three controlling factors, in turn depending on the use requirements. These are (1) the magnitude of the voltage available from the voltage supply means; (2) current input and output response of the logic means, and (3) operating current of a failure-warning indicator such as a dashboard lamp.

Where 115-volt AC mains and high voltage rectifier or battery sources are available, standby resistance levels can be higher than that of a sensor for a vehicle carrying only a 12- or 6-volt battery, or a 1.5 volt failsafe capacitive source. Typically, a predetermined resistance value will be selected which will result in a current flow of no more than about 0.1 milliamperes through the sensor in order to remain significantly below normal gate currents of about 1.0 milliampere for digital transistor logic. Therefore, crash sensors will generally have a standby resistance value between about 50,000 ohms and 10 megohms, preferably 150,000 ohms to 1–2 megohms.

Suitable sensors are also broadly characterized by having a range of resistances upon application of pressure that are lower than the standby resistance. The range normally extends from the standby resistance to at least as low as 50,000 ohms, and preferably to at least as low as about 1,500 ohms, so as to produce milliampere-size current in conjunction with a car battery or a 1.5 volt fail-safe capacitor as voltage supply means for the logic assembly. Threshold resistances will therefore generally be between about 50,000 ohms and 1,000 ohms, and threshold currents will generally be between about 0.1 and 5 milliamperes, although values may vary widely from these ranges as use dictates.

The pressure-sensing surface area usually comprises one or more faces or sides of the sensor or merely a part of a face or side of the sensor. The responsive area can be determined by the dimensions of the object which directly exerts pressure, for example, a touching finger, a moving object on an assembly line, a weight bearing down by gravity, or an inertial mass placed in crash alignment with the sensor. To conserve material the sensor itself can be as small as a fraction of an inch in diameter or rectilinear dimensions. Pressure contact may be indirect, for example, through lever arms or other mechanical advantage systems known in the art. By these and other known ways the force per unit responsive surface area may be varied to suit the application (sensor input) and the logic means (sensor output).

The sensors of this invention are characteristically non-ohmic and show an inverse dependence of sensor resistance upon pressure that extends over a working pressure range from about 3 to 50 psi. There is no limit other than the practical one of not destroying the sensor structure in case it must be used over again. Detectable pressure can be transformed and pressure adjusted by mechanical advantage over a wide range to suit working pressure at the sensor, and similarly the threshold pressure level can be adjusted over the same sort of wide range; thus, detectable threshold pressure can normally be adjusted to convenient levels between about 0.5 and 3,000 psi. In the working range, as pressure increases by a factor, resistance decreases by more than that factor. Preferred sensors of this invention are steeply nonlinear, e.g., they show a reduction in resistance by at least a factor of 5 for a twofold increase in applied pressure, and sometimes reduction by a factor of, say, 10 or more, especially at higher pressure.

Figure 3:
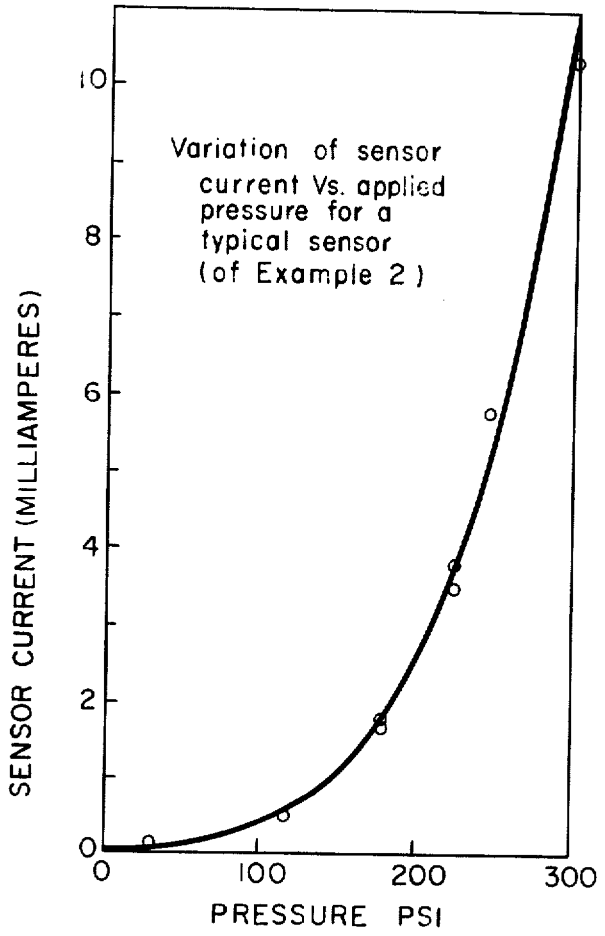
FIG. 3 is a graphical representation of a typical variation of sensor current with applied pressure for a sensor containing titanium carbide particles in a polyurethane rubber matrix.

Increasing steepness at higher pressure produces a virtual step or upward break in the corresponding currentpressure response curve illustrated in FIG. 3, and it is convenient to choose the threshold value of resistance to be the resistance value at the break in the current-pressure curve. Thus, for a given supply voltage, a threshold value of current can be made coincident with gate current required for modern digital transistor logic.

In general, the sensors have a positive temperature coefficient of resistance like metals. Co-distribution of supplementary semiconductor particles having a compensating negative temperature coefficient of resistance in the elastomeric material can expand the operative temperature range to suit normal use of between about 220°F. and −40°F. Alternatively, a bridge-type logic circuit can be used which employs, as a temperature-compensating reference element, a protected, unstressed electrical resistor of the same composition.

The Sensor

Particle Composition and Conductivity

Particles useful in this invention are intrinsically conductive and are sufficiently conductive, even in particulate form, to produce a monitorable resistance of the sensor element. Their degree of conductivity is like that of various metals, ranging from about $10^6$ to about $10^3$ reciprocal ohm-cm for the compositions in bulk form. In powder compactions, conductivity values are lower, but generally fall between a value for a highly conductive powder such as gold and a value for less conductive graphite powder. Essentially all the powder compactions are more conductive than graphite powder.

The particles, when distributed in elastomeric material, form a non-ohmic elastic resistor whereas more conductive metal powders and less conductive graphite or carbon powder similarly distributed form essentially ohmic resistors. Only by turning to forms other than particles, for instance, fine metal wires in an elastic foam, does one normally encounter non-ohmic conduction of metal materials. By non-ohmic is meant a power law dependence of current upon applied voltage, where the powder $n$, in an approximate relationship $I=KV^n$, usually varies for the metallic-conductive particle/elastomeric material compositions of this invention between about 1.1 and 2.0, $K$ being essentially a constant.

According to the invention the volume ratio of particles to elastomer is adjusted to attain a monitorable resistance between about 10 megohms and 50,000 ohms. With increasing particle content the transition from infinite resistance to too low a resistance occurs rather suddenly, whereas it is relatively simple to select a suitable volume ratio over a wide range using the particles of this invention.

Suitable compositions for particles comprise at least one member selected from the group consisting of electrically conductive borides, carbides, nitrides, and silicides of at least one transition metal selected from Periodic Groups IV, V, and VI. Excluded are those compositions that do not show metallic character, i.e., are not electrically conductive like metals; see, for instance, the Table presented by G. Hägg Z. phys. Chem. B 6, page 222 (1929).

Other metallic conductive particles useful in sensor compositions of this invention comprise threecomponent alloys of metal A, metal B and silicon, metal A being cobalt or nickel present as 50 to 77 atomic percent, metal B being molybdenum or tungsten present as 18 to 33 atomic percent, and silicon being present as 4 to 22 atomic percent. Typical are the cobalt base alloy compositions containing substantial amounts of molybdenum and silicon described in coassigned U.S.

Pat. No. 3,180,012. A preferred alloy contains, by weight percent, about 55Co/35Mo/15Si, corresponding to, by atomic percent, about 56.5Co/22Mo/21.5Si.

In the spirit of this invention, some interstitial alloys of transition metals selected from Periodic Groups IV, V, and VI with the metalloid atom hydrogen and with phosphorus and germanium can also be expected to form metallic-conductive particles useful in sensor compositions of this invention.

Borides, carbides and nitrides of each of the following common transition metals will be useful in particle form in the sensors of this invention: titanium, vanadium, chromium. Additional operable compositions are those set out in the Hägg article, referred to above, as being electrically conductive like metals.

Particles of the following conductive compounds are particularly suitable for this invention: titanium carbide, zirconium carbide, niobium carbide, tantalum carbide, tungsten carbide, hafnium carbide, and titanium disilicide, all of which are intrinsically moderately conductive materials suitable for attaining a monitorable standby resistance value. Preferred for attaining also very steep, nonlinear resistance respondes to pressure are titanium carbide and titanium disilicide. Titanium carbide is especially preferred.

Conductive Particles (shape and size)

The average size of the particles useful in this invention is in the range of about 0.01 to 1,000 microns. The thinner the thickness of the elastic resistor, the finer should be the particle size. Particles having an average size of about 20 microns represent a preferred size. Such particles can be ground using common wet and dry grinding techniques. The preferred particles are those that have corners or sharp edges and are classifiable according to a recognizable cubical, acicular or lamellar particle shape. Said sharp edges are especially characteristic of the preferred titanium carbide particles and are believed to serve as pressure points between adjacent particles which enhance the non-ohmic characteristic of the sensor and the steep, nonlinear response to applied pressure. The alloys of transition metals with the metalloid atoms are known to form hexagonal close-packed and cubic structures and many exhibit a common cubic crystalline form. Acicular particles are at least several times longer than their smallest diameter and resemble a needle or rod. Lamellar shapes are extremely thin plates or flakes that sometimes overlap or overleaf to form an almost continuous layer.

The Sensor

Elastomeric Material

By elastomeric material is meant an electrically insulating material capable of elongation with substantial recovery of its original dimensions.

Preferably, the elastomeric material (when tested without the particles) should be capable of being elongated at least 20% (A.S.T.M D412 test), and still retract to essentially its original length, although sometimes a less elastic material may be suitable for one time use as in a crash sensor. Elongations generally range from about 20% to 500% and Shore Durometer A2 hardnesses from about 20 to 95 (ASTM 2240 test). The elastic material may be introduced in a suitable "carrier solvent" and the appropriate parts by weight of particles added thereto to form a dope.

The nature of the elastic material itself can vary widely and its composition is not critical provided it is sufficiently elastic as defined. Materials with such elastic properties include natural rubber, synthetic polyisoprene rubber, elastomeric chloroprene polymers, fluoroolefin elastomers, butadiene-styrene rubber, ethylene/propylene-nonconjugated diene rubbers, silicone rubbers and rubbery condensation polymers such as polyurethanes obtained by reaction of polyisocyanates with polyalkylene glycols. The elastic material can also contain fillers, reinforcing agents or plasticizers commonly added to elastomers, providing the properties of the resultant material remain within the limitations hereinbefore recited.

For convenience in fabricating sensors by casting flexible electrical resistors in a sheet or layer to which area electrodes can be applied, it is desirable to handle fluid from which the final layer composition can be formed in place. Accordingly, instead of the normally solid elastic material by itself or in a carrier solvent, there can be employed an elastic matrix-forming material along with suitable amounts of the powder component.

Such elastic matrix-forming material includes any one or more of (1) preformed polymer which can be further cured to form an elastomer, a curing agent, and optionally a carrier solvent; (2) preformed polymer and optionally a carrier solvent, said polymer being curable by heating or irradiation; (3) polymer precursor, chemical agent to convert said precursor into elastomer, and optionally an inert voltaile solvent as thinner; (4) liquid prepolymer, self-curing or containing a curing agent.

By "carrier solvent" as used herein is meant a liquid dispersion medium for transporting one or more substances, such as the particles of this invention, which also is capable of solubilizing other materials such as curing agent or chemical agent for polymerization if such be present, e.g., acetone, xylene, tetrahydrofuran, benzene, toluene, dimethylacetamide, ethyl ether, chloroform and dimethylformamide. Said carrier solvent need not be completely removed by subsequent treatment provided the required criteria for elongation and recovery are met by the resultant elastomer.

In making the sensors of this invention, dopes can be used which are dispersions of particles in polymer solutions in volatile carrier solvents, e.g., a solution of hydrocarbon rubber in benzene or toluene. Another type of dope might also contain a reactant in addition to the solvent to promote further polymerization of an elastic matrix-forming material that may or may not yet be sufficiently elastic to meet the required criteria for elongation and recovery. For example, a dope useful in making a non-ohmic elastic resistor contains 20 wt. % polyurethane rubber such as a reaction product of toluene diisocyanate and plyalkylene ether glycol in dimethylformamide containing 3.5 V/V% $H_2O$. Preferred, highly elastic electrical resistor formulations include treated powders, as will be described, in self-curing liquid prepolymers such as room temperature vulcanizable (RTV) silicone rubbers, particularly those curable by moisture or in solvent-free, catalyst-curable silicone rubber.

If desired, elastomers capable of undergoing further reaction, such as chain extension or crosslinking, can be "cured" in situ in the presence of the metallic-conductive particles. For example, curing agents such as peroxides or sulfur for unsaturated systems represented by hydrocarbon rubbers including natural and synthetic rubbers derived from olefins and polyolefins can be incorporated into compositions of this invention and subjected to curing conditions that are well known, e.g., heating. Alternatively, rubbers can be cured by irradiation under conditions known to the art for hardening them.

Preferred as pressure-sensitive electrical resistors are elastic resistors wherein the conductive particles distributed in the elastic matrix are not wetted by the elastomer, especially at higher loadings of particles. These are called diluent particles since they merely occupy volume and do not substantially reinforce the elastomer. The resistor compositions have hardness and elongation values that remain in the same ranges as those of the elastomeric materials alone despite the presence of metallic conductive particles. By ASTM test 2240 their hardnesses generally range in value from about 20 to 95. Elongations should generally range from about 20% to 500%. Pretreatment of the particles with sufficient surface-dewetting agent to make the particles non-wettable is generally sufficient to insure such retention of hardness and elasticity. Such pretreatment also produces less viscous mixtures that are readily coatable even with higher loadings of metal particles.

It is surprising that the electrical properties of the resultant elastic resistor are much better suited for use in a sensor/logic assembly than the fully wetted, less resilient resistor that can be made with the same components. Usually, higher loadings of particles can be used with greater control of the monitorable resistance under standby conditions. Sometimes, the resistance change for the same applied pressure tends to be greater and more nonlinear, thereby producing a sharper threshold for discriminating pressure amplitude and duration. Even more advantageously, hardnesses and uncompressed volumes tend to be stable during pressure cycling and as a result, their mechanical and electrical properties tend to be constant.

In practice, a preferred elastomeric material can be modified by direct addition of an appropriate surface dewetting agent or agents to reduce its ability to wet reinforcing particles. Alternatively, such an agent can be introduced into the elastomeric material indirectly by first applying it or coating it on the diluent particles and combining the treated particles with the elastomeric material. Normally, dewetting agents are chosen which preferentially wet the particles instead of the elastomeric material. A simple test can be used to determine whether a particular agent is effective for this purpose. It requires coating a plane surface of the same composition as the particles with the elastomeric material to which the candidate agent has been added. Bonding between the coating and the receiving surface is then determined by a peel strength test using a self-adhesive cellulose tape about one-half-inch wide, pressing it onto the outer surface of the coating to obtain the maximum amount of contact between the adhesive on the tape and the coating, and then pulling the tape off quickly at an angle of peel greater than 90°. If the coating readily peels off in one piece, particle-elastomeric material adhesion will be correspondingly weak in a prepared composition of this invention. Preferred RTV silicone rubber, for instance, shows essentially no peel strength, separating cleanly from a TiC test surface upon lifting just an edge.

Surface dewetting agents that are suitable for reducing bonding or van der Waals interaction between many particle-elastomer combinations include silicone oils, mineral oil such as "Nujol" liquid paraffin, other paraffins, petroleum ether, glycerol, and mixtures thereof. Commercially available cationic surface-modifying agents such as Arquad 18-50 (Armour Co.) are usefull in appropriate amounts. These agents can be added directly to other ingredients of the elastomeric material, i.e., elastomer and plasticizer, in formulating elastomeric material. Alternatively, these and other surface dewetting agents can be incorporated in a carrier solvent in concentrations limited only by agent solubility and solvent compatibility with other ingredients of the elastomeric material. Effective amounts depend in general upon the particle size, the effective surface area, and the volume ratio of particles present, as well as the activity of the agent itself. Suitable concentrations based on the elastomeric material will ordinarily range from a minimum amount for dewetting varying from about 0.01% to 1.0% by weight to large amounts that can also reduce the viscosity of the compositions as well as dewet. Preferred amounts are readily determined by the peel strength test or by studying the resultant decrease in permanent volume deformation during pressure cycling.

The Logic Means

Suitable logic means for use as a component in the sensor/logic assembly of this invention need only be capable of discriminating between resistance values above and below a selectable threshold value of resistance of the sensor, or a corresponding threshold value of sensor current for a given electrical voltage supply means. Although some logic means other than transistor circuits are available with suitable response times using known electromechanical and electronic tube circuitry, modern day digital transistor logic is much preferred for actuating devices, particularly vehicular safety devices.

Some common logic systems are RTL (resistor transistor logic), RCTL (resistor capacitor transistor logic), DCTL (direct coupled transistor logic), DL (diode logic), LLL (low level logic), CML (current mode logic), DTL (diode transistor logic), CDL (core diode logic), 4 Layer (device logic), TDL (tunnel diode logic), ECL (emitter coupled logic), and TTL (transistor-transistor logic). Of these, TTL is particularly preferred as a logic means for actuating vehicle safety devices, because the sensor/output assembly output current produced by the TTL is sufficiently high (normally severalfold greater than the 1.0 milliampere gate current) to directly power integrated circuitry and the firing of explosive charge which may be preliminary to actuation of the vehicular safety device itself. When lower power consumption or lower cost is essential, other known logic means based on metal oxide semiconductors (MOS) can be used, for example, the complimentary symmetry metal oxide semiconductor (C/MOS) type.

In a preferred sensor/logic assembly the logic means is used in conjunction with a singnal-delay means capable of extending the time period required by the logic means to detect that a threshold resistance or current value has been reached. Normally, the response time of a logic means is determined by the nature of the logic means itself. For example, transistor-transistor logic responds in a fraction of a microsecond. It is desirable, however, to respond only to a pressure duration of the order of milliseconds sometimes, and not respond to the same pressure amplitude applied for a shorter time.

Road vibrations and bumps occur and pass away in microseconds, whereas a crash situation has a duration of 5–25 milliseconds or longer depending upon velocity, distance from the front bumper to the driver, and other factors. Therefore, it is preferred to provide a signaldelay means to lengthen TTL response time. One way is to provide a capacitive element is parallel with the pressuresensitive elastic resistor so that the current buildup in the current-carrying connecting means and also in the elastic resistor itself is delayed by the charging time for the capacitor.

Another way to delay the response of the logic means is to provide a signal delay means that is located between the input terminal and the output terminal of the logic means rather than before the input terminal. Such signal delay means are well known in the art of integrated circuits and need not be described here.

Basic logic circuits other than TTL are equally applicable to the purpose of this invention. Those which contain transistor elements generally use the base-to-emitter diode of the transistor as the diode decision element. Other decision elements are known in the art. In addition, basic logic circuits can be aided by other circuits, which perform such functions as signal amplification, speed buffering, signal delay, and local high-speed storage. These support circuits are often formed from the basic elements of the logic circuits themselves. Thus, other current-buildup delay means than the shunt capacitor (18 in FIG. 1) are available to restrict response to pressure having a certain duration, and can be formed from or combined internally with the basic elements of the logic means. Furthermore, other wave shapes than constant level (commonly called DC) such as sine waves and pulse trains can be discriminated by a suitable assembly of a pressure sensitive electrical resistor operating in an unbalanced mode and a logic means aided by a suitable support circuit.

The sensor/logic assembly of this invention differs from ordinary pressure sensors capable of actuating a device by its finite monitorable standby resistance and its discrimination for predetermined kinds of input above a threshold level. It can be constructed to be oblivious to undesirable input that differs only slightly in amplitude, duration, or direction, or combinations thereof from a predetermined input level.

For actuating a safety device for an automotive vehicle a plurality of such elastic resistor sensors are useful, each mounted in crash alignment with an inertial mass such as a touching metal ball in a supportive housing and individually placed at suitable locations such as directly behind the front bumper. The sensors operate in combination with assembled and integrated logic means circuitry for all the sensors located usually at the dashboard with a malfunction light that serves as a monitor each time the ignition is switched on. In case of a crash, the inertia of the metal ball increases the pressure on the sensor from essentially zero to a value determined by the ball's mass and the crash angle, whereupon the sensor resistance drops, an increased current flows through the sensor sending an actuating signal to an integrated circuit which in turn triggers the firing of an explosive squib, causing an air-bag to expand, or a restraining harness to be pulled tighly about one or more passengers, etc.

A preferred sensor/logic assembly can distinguish vehicle crash impacts by detecting speed to within about 1–2.5 miles per hour, crash duration from 0 to 5 milliseconds, and impact angle to within the minimum ±30° horizontal and 35 15° vertical angular specification set for air-cushion deployment in frontal impact.

In less critical applications the assembly of this invention may introduce subtleties of variable touch control in typewriter or electronic musical instrument keyboards and prevent jamming of keys. In counting events it can restore itself for again actuating a device within 20 milliseconds or less either after an actuation or after being subjected to an input close to the predetermined input level.

The following Examples are provided to illustrate satisfactory preparations of sensor/logic assemblies for general use in reliably actuating devices such as typewriters, electrical musical instruments, floor mat sensors, weighing systems, sensory systems for use in explosion areas which require non-sparking elements, and the like; also special assemblies for use in automobiles and trucks where reliability is of paramount importance in actuating safety devices for passenger constraint such as air cushions or retractable belt/harnesses.

EXAMPLE 1

A mixture of 4.0 parts by weight of titanium carbide (325 mesh) and 1.0 part by weight of an elastomeric hydrocarbon rubber, a terpolymer of ethylene, propylene and 1,4-hexadiene (460–480% elongation), in saturated toluene solution containing 7% by wt. (of the rubber) dicumyl-peroxide added as curing agent was stirred together until the conductive TiC particles were distributed and well dispersed. The mixture was then cast in a layer about 25 mils thick on a microscope glass slide and allowed to air-dry before heating to 75°C. for 2 hours. The equivalent volume ratio of the particles to cured elastomer in the cured layer was about 1:1. Conductive silver electrodes were then painted side-by-side on the exposed surface of the dried and cured mixture at a distance of separation from each other sufficient to form an electrical resistor having a monitorable standby resistance when uncompressed of approximately 250,000 ohms, as indicated by temporarily applying a voltage source and a current indicating meter.

A 50 gram weight was applied over a 0.5 cm. dia. circular area of the resistor surface, and the resistance of the resistor decreased to approximately 350 ohms. The weight was removed and reapplied to the same surface area at least four times, causing successive transitions between the resistance values first observed under standby and compressed conditions.

Use of the electrical resistor so formed as a pressure-sensitive sensor in combination with a common trnasistor logic as in FIG. 1 produced a sensor/logic assembly suitable for controllably actuating a musical sounding device when the resistor was pressed with a finger.

EXAMPLE 2

Using the same parts by weight as in Example 1, a mixture of the titanium carbide particles (325-mesh) and an elastomeric reaction product of diisocyanate and polyalkylene ether glycol ("Adiprene" C polyurethane rubber) in 10% chloroform solution was mixed, cast, and heat-cured as in Example 1 to form an elastic resistor layer having about 1:1 volume ratio of particles to elastomeric material and exhibiting pressure sensitivity as follows. Continuous variation from a monitorable resistance of 2 megohms at zero pressure to 50 ohms with finger pressure on a ½ inch diameter disc (one-eight inch thick) was observed.

The pressure-sensitive electrical resistor so formed and tested was suitable for general use in combination with a common transistor logic as a sensor/logic assembly. By application of forces as high as 30 pounds, over the disc area, currents of 200–300 milliamperes were obtained from a voltage supply means that provided 10 volts. The electrical resistor was non-ohmic, and a change in force at a high force level resulted in a greater change in current than a similar change in force at a lower force level.

The electrical characteristics were suitable for driving TTL logic of the type shown in FIG. 2 by forming a sensor/logic assembly of the type shown in FIG. 1. Standby sensor current was adjustable to less than the typical 1 milliampere TTL gate current and sufficient resistance drop occurred under compression to allow more than the gate current of the TTL to flow, corresponding to a threshold resistance of about 1,200 ohms for a 12-volt auto battery. The threshold pressure corresponding to 1 milliamp is about 150 psi as can be seen by referring to FIG. 3.

The electrical resistor connected to a type 7474 TTL according to FIG. 1, upon being subjected to a constant force of about 15 pounds, provided a "set" input to the flip-flop sufficient to provide an actuating voltage for a vehicular safety device at the Q terminal of the TTL.

EXAMPLE 3

A mixture of 4.5 grams of titanium disilicide powder of 325-mesh particle size, 1.0 gram of moisture-curable, room-temperature vulcanizable (RTV) silicone rubber, and 1.0 cc of petroleum ether B.P. 37.7°–49.2°C. as dewetting agent for the elastomer was placed in a mold in sufficient amount to fill a volume between a dry lower mold closure surface and a moistened fiber board upper mold closure surface about one-sixteenth-inch apart. Sufficient time was allowed for the moisture contained in the masonite board to effect downward curing of the silicone rubber to the lower closure surface at ambient temperature without application of mechanical pressure to either closure surface. A ¼-inch diameter piece was punched out of the casting (called the pill). Opposed electrodes were then affixed to the opposite planar surfaces of the cured, elastomeric pill to form an elastic resistor which showed a finite, monitorable electrical resistance of 1.5 megohms before application of mechanical pressure. In a separate test, the electrical resistance of such an elastic resistor fell to about 5,000 ohms when a hydraulic force of 25 pounds was applied to compress the volume of the cured mixture between the affixed, opposed electrodes, such resistance value being suitable for supplying gate current to TTL logic means using an autombile battery as a voltage source.

EXAMPLE 4

A powdered alloy having the composition of 55% cobalt, 35% molybdenum, and 10% silicon, by weight, was prepared by arc-melting with a tungsten electrode and a deep boat-shaped copper hearth to minimize contamination and weight loss and by repeatedly arc-melting a sufficient number of times to insure homogeneity, said procedure of alloy formation and subsequent powder formation from said alloy being essentially as described in Example 1 of U.S. Pat. No. 3,180,012.

A mixture of 9.0 grams of the rsutlant cobalt base alloy composition powder having a recognizable sharp-edged particle shape under the microscope and an average particle size of 230-mesh, 1.0 gram of moisture-curable room-temperature vulcanizable silicone rubber (General Electric Company Silicone Adhesive/Sealer no. 112), and sufficient petroleum ether B.P. 37.7°–49.2°C. as dewetting agent to reduce viscosity and permit pouring of the mixture was combined by stirring and placed in a 1-inch diameter mold about one-sixteenth inch deep.

After allowing sufficient time to cure in situ to form a distribution of the metallic-conducting particles in the elastomeric silicone rubber, opposed electrodes were applied as in Example 3 and serially connected to a voltage source and indicating current meter. The monitorable standby resistance of the elastic resistor sensor was about 10 megohms. In a separate test, under pressure as described in Example 3, the electrical resistance of the sensor dropped to 10 ohms. Such a low resistance value is suitable for supplying large actuating current signals for device operation.

EXAMPLE 5

A mixture of 1.0 gram of the silicone rubber of Example 4, and 1.0 cc. of petroleum ether having a boiling point range of 37.7°–49.2°C. was combined with 4.5 grams of 325-mesh titanium carbide particles and mixed without difficulty due to high particle loading by stirring until the particles were distributed uniformly. The mixture obtained was then placed into the same mold of Example 3 with a premoistened upper mold closure surface of fiber board. The mold was opened after three hours and the curing of the composition to form a thin layer one-eighth-inch thick was completed in air. A rectangular portion of the layer was cut to ¼-× ½-inch size, and two 2-mil copper sheet electrodes were glued to opposing planar surfaces, using a two-component conductive adhesive suitable for silicone rubber.

The cured elastomeric composition having such electrodes affixed to form an elastic resistor showed a monitorable electrical resistance before application of mechanical pressure and a steep resistance dependence upon pressure as in Example 2, suitable for use in a sensor/logic assembly that can distinguish vehicle crash impacts by detecting speed to within about 1 to 2.5 miles per hour, crash duration to within about 0 to 5 milliseconds.

Peel Test

Concerning the terpolymer described in Example 1 and the silicone rubber described in Example 5, even in the absence of dewetting agent, it was found after coating said materials on test surfaces of TiC that in each instance the peel strengths were less than 1 pound per inch and that the coatings readily separated from the test surface substrates. Thus, said elastomers are preferred for use in the sensor/logic assemlby of this invention.

The embodiments of the invention in which an exclusive property or privilege is claimed are defined as follows:

1. An electrically operated sensor/logic assembly for actuating a device, the assembly comprising, in cooperation, i. as sensor, a pressure-sensitive, non-ohmic elastic resistor comprising a continuous, elastomeric material having metallic-conductive particles distributed therein in sufficient volume ratio to impart to said resistor a monitorable standby resistance above a threshold value and a capability for resistance reduction below a threshold value upon application of a preselected degree of pressure, the monitorable standby resistance value being between 50,000 ohms and 10 megohms, said threshold resistance value being discriminated by ii. a logic means connected thereto and adapted to provide a device-actuating signal upon reduction of sensor resistance below the threshold value.

2. An assembly according to claim 1 wherein the metallic-conductive particles are selected from at least one member of the group consisting of the electrically conductive borides, carbides, nitrides and silicides of a transition metal selected from Periodic Groups IV, V and VI, and a three-component alloy of metal A, metal B, and silicon, metal A being cobalt or nickel present as 50 to 77 atomic percent, metal B being molybdenum or tungsten present as 18 to 33 atomic percent, and Si being present as 4 to 22 atomic percent.

3. An assembly according to claim 2 wherein the metallic-conductive particles are selected from at least one member of the group titanium carbide, zirconium carbide, niobium carbide, tantalum carbide, tungsten carbide, hafnium carbide, titanium disilicide, and a three-component alloy containing, by atomic percent, about 56.5% cobalt, 22% molybdenum and 21.5% silicon.

4. An assembly according to claim 3 wherein the metallic-conductive particles are titanium carbide.

5. An assembly according to claim 3 wherein the metallic-conductive particles are titanium disilicide.

6. An assembly according to claim 3 wherein the metallic-conductive particles are of a three-component alloy containing, by atomic percent, about 56.5% cobalt, 22% molybdenum and 21.5% silicon.

7. An assembly according to claim 3 wherein the elastomeric material is selected from the group hydrocarbon rubber, polyurethane rubber, and silicone rubber.

8. An assembly according to claim 4 wherein the elastomeric material is hydrocarbon rubber.

9. An assembly according to claim 4 wherein the elastomeric material is polyurethane rubber.

10. An assembly according to claim 4 wherein the elastomeric material is silicone rubber.

11. An assembly according to claim 6 wherein the elastomeric material is silicone rubber.

12. An assembly according to claim 1 wherein the sensor contains metallic-conductive particles in a volume ratio to elastomeric material of between about 2:3 to 2:1, respectively.

13. An assembly according to claim 1 wherein the metallic-conductive particles are not wetted by the elastomeric material.

14. An assembly according to claim 1 wherein the logic means is transistor-transistor logic.

15. An assembly according to claim 1 having serially connected to the sensor a voltage supply and an indicator for discriminating the monitorable resistance of the sensor.

16. An assembly according to claim 15 wherein the indicator is a continuity-indicating lamp and the voltage supply is capable of supplying rated lamp current.

17. An assembly according to claim 1 containing additionally a current-buildup delay means.

18. An assembly according to claim 1 wherein the device is a crash sensor and wherein the assembly contains, additionally, an inertial mass in crash-alignment with the sensor.

19. An assembly according to claim 18 containing additionally a current-buildup delay means.

20. An assembly according to claim 19, for actuating a passenger restraint device in a crash situation, wherein the delay means comprises at least one capacitor having sufficient capacitance to insure a time constant shorter than the duration of the crash, but sufficiently long to avoid unwanted actuation of the restraint device.

21. An assembly according to claim 20 wherein the logic means is transistor-transistor logic.

* * * * *